US006142415A

United States Patent [19]

Ambrico

[11] Patent Number: 6,142,415

[45] Date of Patent: Nov. 7, 2000

[54] AEROSTATIC LIGHTING DEVICE

[75] Inventor: Francesco Ambrico, Grenoble, France

[73] Assignee: Olivier G. M. Farges, Paris, France

[21] Appl. No.: 08/373,860

[22] Filed: Jan. 17, 1995

[30] Foreign Application Priority Data

Jan. 27, 1994 [FR] France ................................ 94 01099

[51] Int. Cl.[7] ................................ B64B 1/50; F21S 1/10; A63H 37/00

[52] U.S. Cl. ............................ 244/33; 362/363; 362/96; 362/267; 446/220

[58] Field of Search ............................ 244/31, 33, 129.1, 244/1 R; 446/220–225, 129, 137, 485, 486; 73/146.8, 730; 116/34 R, DIG. 8, 266; 40/126 R, 540, 214; 362/320, 812, 86, 96, 352, 253, 363, 267, 431, 278, 376

[56] References Cited

U.S. PATENT DOCUMENTS

| | | | |
|---|---|---|---|
| 1,383,115 | 6/1921 | Hendry | 446/221 |
| 2,619,303 | 11/1952 | Martin | 244/33 |
| 3,345,506 | 10/1967 | Hautzenroeder | 244/33 |
| 3,546,944 | 12/1970 | Mack | 116/266 |
| 3,745,677 | 7/1973 | Moran | 244/33 |
| 3,839,631 | 10/1974 | Goddard | 244/33 |
| 3,871,422 | 3/1975 | Elson et al. | 244/33 |
| 4,262,529 | 4/1981 | Rosenblatt et al. | 116/DIG. 8 |
| 4,810,223 | 3/1989 | Stockton | 446/225 |
| 5,119,281 | 6/1992 | Akman | 244/33 |
| 5,183,329 | 2/1993 | Chen | 244/33 |

*Primary Examiner*—Galen L. Barefoot
*Attorney, Agent, or Firm*—Willie Krawitz

[57] ABSTRACT

A lighter than air lighting device is disclosed comprising a dual envelope balloon providing an inner, gastight, elastic, transparent, expandable polymeric envelope such as polyurethane, containing a lighter than air medium such as helium, and a replaceable lighting device such as a halogen or arc lamp. The helium thus functions to both elevate and cool the lighting device. The inner, transparent envelope is surrounded by an outer envelope such as a colored silk or nylon which functions as a diffuser to provide sufficient illumination without dazzling the user. The outer envelope may also be used to carry information and advertizing messages.

16 Claims, 2 Drawing Sheets

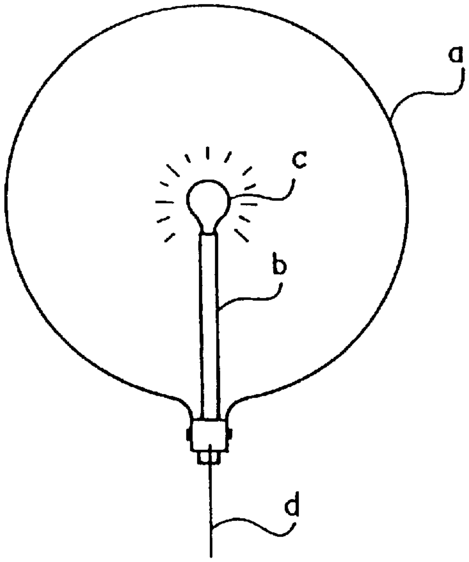
FIG. 1
PRIOR ART
FIG. 5
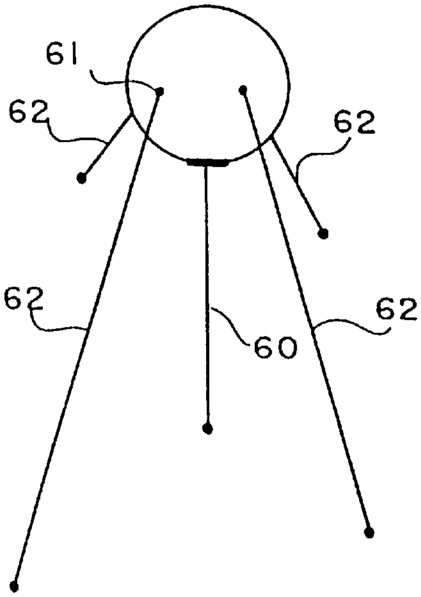
FIG. 6A
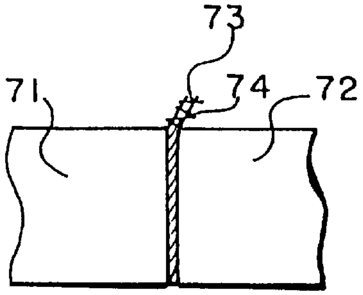
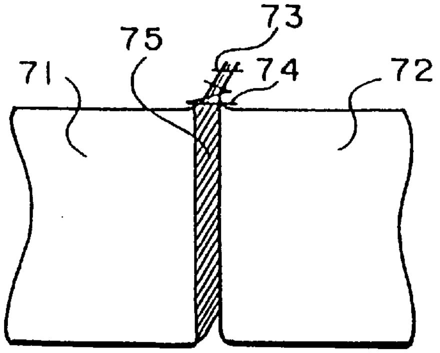
FIG. 6B

AEROSTATIC LIGHTING DEVICE

BACKGROUND OF THE INVENTION

This invention relates to a lighter than air balloon containing a lighting device. The idea of using such devices for lighting or decorative purposes is extremely old and already appears in the German patent 427,894 registered on Oct. 26, 1924.

The only figure in this German patent is reproduced in the major lines in FIG. 1 enclosed. The device comprises balloon a. having rod b. secured to a pole of the balloon corresponding to the closing system. A bulb c. is fastened to the end of the rod roughly in the middle of the balloon. A wire d. for securing and supplying the balloon is attached to the closing system.

Many other patents have since been registered for similar systems. Nevertheless, despite their long existence, these lighter than air lighting devices have not really been commercially successful. This is doubtless due to the fact that their manufacture, closing, dismantling and attachment were relatively complex.

One of the purposes of this invention is therefore to provide a lighter than air lighting device which is easy to manufacture, assemble and dismantle.

Another purpose of this invention is to provide an aerostatic lighting device which can be used for a large number of applications and supply different lighting at the cost of minimum modifications to its structure.

THE INVENTION

In order to achieve these and other purposes, this invention makes provision for a balloon containing a lighting device comprising a balloon inflated by a gas lighter than air. This balloon is attached at pole level by a feeder cable and contains a bulb supported by a rod fastened to the pole. The balloon comprises a thin, transparent, gastight, inner envelope, and an outer envelope made of a colored diffusing material and with selected optical properties.

According to one manufacturing procedure of this invention, the inner envelope is made of polyurethane and the outer envelope is constructed of a synthetic fabric such as silk or nylon.

According to one manufacturing procedure of this invention, both envelopes have a circular opening at the level of the above-mentioned pole and are associated with a closing mechanism comprising an inner ring-shaped collar to which the outer edge of the inner envelope opening is fastened and on which the outer edge of the outer envelope opening bears; an outer ring-shaped collar with the necessary means to apply and lock it against the inner collar by holding the outer edges of the openings of both envelopes between the two collars; and, a detachable plug to seal off the middle openings opposite the inner and outer collars. This plug is fitted with at least one sealable orifice for accessing the balloon inner cavity and with means for supporting the above-mentioned rod, the plug diameter being greater than the bulb diameter.

According to one manufacturing procedure of this invention, the inner envelope is made of an elastic material and the outer envelope of a slightly elastic material with at least two areas sewn together. At least one part of this sewn area is elastic and reveals, when stretched, a strip of a different color to that of the outer envelope.

According to one manufacturing procedure of this invention, the feeder cable is placed inside a telescopic mast.

According the one manufacturing procedure of this invention, the feeder cable is attached to the closing mechanism by elastic means.

The particular purposes, features and advantages of this invention, together with others, shall be presented in detail in the following non-restrictive description of special manufacturing procedures, in conjunction with the enclosed figures, including:

A BRIEF DESCRIPTION OF THE DRAWINGS

FIG. 1 represents a conventional aerostatic lighting device such as illustrated in the German patent 427,894;

FIG. 5 illustrates a means of attaching the aerostatic lighting device according to this invention;

FIGS. 6A and 6B represent a means of producing an inflation detector for the outer envelope of an aerostatic lighting device according the invention; and, FIG. 7 illustrates a means of producing a cable securing system for the aerostatic lighting device according to this invention.

DESCRIPTION OF THE PREFERRED EMBODIMENTS

One of the problems arising with the former-style single envelope aerostatic lighting devices is that this envelope has to satisfy a number of requirements which are difficult to satisfy with only one material. In particular, this envelope must be gastight to the lighter than air gas used to raise the balloon. The choice of material is thus relatively limited, especially when gas such as helium is used. In point of fact, this envelope must be light, gastight, exhibit the desired light diffusion properties to ensure observers are not dazzled by the inside bulb and, if required, be able to be colored in various manners or carry a variety of information or advertising messages.

To solve this problem, this invention firstly proposes using a dual envelope balloon, the first envelope will satisfy gastight requirements and be as transparent as possible, and the second envelope will satisfy the desired optical requirements. Suitable materials can then simply be chosen for each envelope from among those available on the market.

The inner envelope shall for example be made of 50 micrometer thick polyurethane and is obtained by thermoforming or made up of yarn cops assembled by high frequency thermosealing. Commonly available polyurethanes are transparent and exhibit satisfactory expansibility properties when they are a few dozen to a few hundred micrometers thick. They are also extremely light for such thicknesses.

The outer envelope will be for example be made of a very thin fabric, such as natural or synthetic silk or nylon, coated with an impermeable substance, and virtually non-expandable. As stated above, this outer envelope does not need to be gastight, but must, however, ensure satisfactory light diffusion. It could be given a color selected to bestow characteristics specific to the light provided and, if required, carry informative or advertising messages. It could traditionally be made of yarn cops sewn together.

Furthermore, this invention makes provision for a specific balloon closing system, ensuring in particular easy dismantling of the outer envelope for replacement by another outer envelope with selected optical properties. The same inner envelope can thus be used again for different optical effects. This closing system is illustrated in the enlarged side view shown in FIG. 2.

Figure 2:
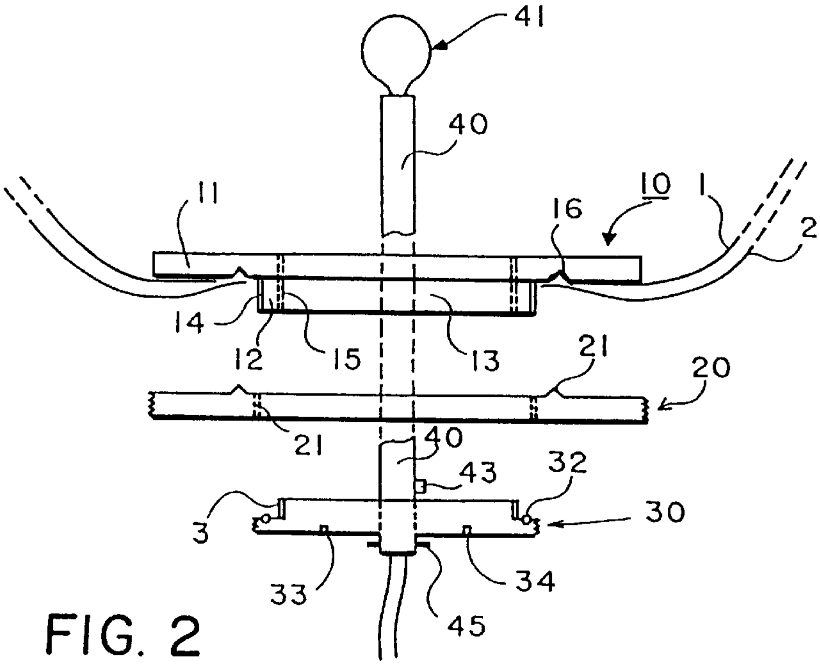
FIG. 2 represents an enlarged side view of the closing area of an aerostatic lighting device according to this invention.

As illustrated in FIG. 2, the balloon comprises an inner envelope 1 and an outer envelope 2, with roughly circular openings at one of the balloon poles which must be sealed by the closing system. This closing system has three elements 10, 20 and 30.

To replace outer envelope 2, simply unscrew outer collar 20, deflate the balloon, replace the envelope and put back outer collar 20. This naturally assumes that outer envelope 2, is sufficiently elastic for inner collar 10 to be inserted into its opening. This elasticity could be the result of the natural elasticity of the material, or of an elastic sewing method.

The third element 30 of the closing system according to the invention is a plug sealing the opening made in inner and outer collars 10 and 20 once they have been assembled. In the example shown, this plug consists of a disk 30 fitted with a shoulder, whose periphery 31 is threaded and screws into the inner screw thread 15 of inner collar 10, with a seal 32 ensuring tightness. However, other assembly methods could be used, for example clipping the seal-fitted periphery of the plug into an inner groove in the opening of part 10 which is not threaded in this case.

The three elements 10, 20 and 30 are made of light, plastic or metal materials.

Plug 30 supports a rod 40 pierced for insertion of electrical conductors supplying a light bulb 41. The length of rod 40 is such that this bulb is approximately in the middle of the balloon. The rod is secured on the plug by any suitable means, for example a protuberance 43 on the inner side and a clip 45 on the outer side.

The bulb could for example have a metallized upper part for lighting the ground when the balloon is designed for outside lighting. This bulb could for example be a halogen bulb or an arc lamp, with a power ranging from a few hundred watts to the highest power currently available, i.e. 6,500 watts. Note that helium provides satisfactory cooling.

The first element 10 is an inner collar which is placed inside the balloon opposite the opening. This inner collar comprises an outer ring 11, a shoulder 12 and a middle opening 13. The cylindrical outer surface of shoulder 12, is fitted with a screw thread 14, and its cylindrical inner surface 13 is fitted with a screw thread 15. The inner envelope 1 is attached by any appropriate means, for example an adhesive (preferably gas tight), to ring 11. In one manufacturing procedure of this invention, collar 10 is made of plastic, for example PVC or polyurethane, with attachment by HF sealing. Inner collar 10 is thus attached to inner envelope 1. The outer envelope is placed as shown on the balloon outer part of ring 11; the inner diameter of the opening of outer envelope 2 roughly corresponds to the outer diameter of shoulder 12 which may comprise a peripheral groove to reinforce attachment.

The second element 20 is an outer collar which is secured onto the inner collar 10, for example by screwing an inner screw thread 21 onto the outer screw thread 14 of shoulder 12. The ring of collar 20 thus presses against the ring of inner collar 10, thereby forcing down and holding outer envelope 2 in place. To reinforce attachment of outer envelope 2, provision may be made for an additional system of grooves 16 and ribs 22 on the inner and outer collars respectively. Tightness of the attachment between inner envelope 1 and the ring of inner collar 10 can be reinforced if necessary by bearing against the other surface opposite the inner and outer collar rings.

It should be emphasized that assembling the inner and outer collars using screws is only one manufacturing procedure of this invention, and that professionals may find various methods for securing outer rings of an inner and outer collar, for example clip-on or external screw clamping systems.

The diameter of the opening closed by plug 30 is specifically constructed greater than the largest diameter of rod 40 and bulb 41 so that, by unscrewing or unclipping plug 30 as applicable, this rod and bulb an be extracted for maintenance purposes and bulb replacement for example. This system means that, with the closing system in the lower position, replacement is possible without having to empty the balloon of its gas. In actual fact, the system according to the invention is designed so that the pressure of the balloon filling gas is slightly higher than atmospheric pressure, e.g. of the order of one hundred pascals, for an atmospheric pressure of roughly 100 hectopascals. The balloon then only needs to be slightly reinflated with helium after the bulb has been replaced.

Figure 3:
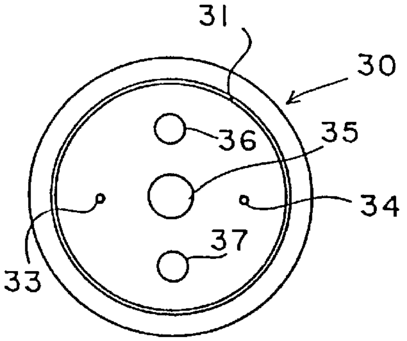
FIG. 3 represents a top view of the closing plug illustrated in FIG. 2.

FIG. 3 represents a top view of plug 30 showing bore 31. If the plug is a screw-on type, it is fitted for example with two blind holes 33 and 34 so that it can be easily unscrewed. The plug can also be unscrewed by the knurling on its outside edge. A middle opening 35 is designed for fastening rod 40. Another sealable opening 36 is designed for balloon inflation, and an additional opening 37 may be provided for other purposes, for example communication with a pressure sensitive switch placed inside the balloon and giving off an alarm signal when balloon pressure is less or greater than a preset pressure. This switch may correspond to the protuberance 43 illustrated in FIG. 2, and the inner plug surface may receive an electronic board (not shown) comprising lamp cutoff and detection circuits. The wire and pipe ducts in openings 35, 36, and 37 are naturally gastight.

Figure 4:
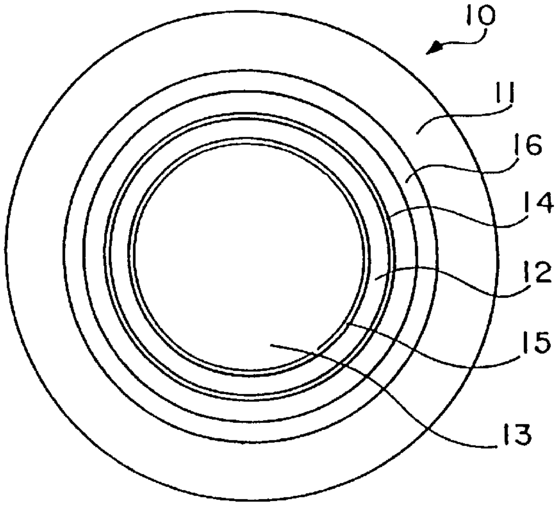
FIG. 4 represents a bottom view of the closing system inner collar illustrated in FIG. 2.

FIG. 4 represents a bottom view of inner collar 10, where the same references refer to the same elements as in FIG. 2. Although not shown in the drawings, the wires leaving rod 40 are part of a cable which is also used to support the balloon like cable d in FIG. 1.

FIG. 5 represents a side view of the balloon in position, secured to the ground by a cable 60.

Choice of a dual envelope system, as described above, means attachment points 62 can be fitted to the outer envelope to secure the balloon. For example if the balloon is used outside, a single bracing wire 62 will be attached to protect against prevailing winds. Four bracing wires 62 could also be used to secure the balloon, as well as merely a very light cable such as electrical feeder cable 60. It will be noted that provision of these attachment points 61 would have been impossible or very hard to achieve if only one envelope were used.

FIGS. 6A and 6B illustrate a means of assembling the outer envelope designed to be used as an inflation indicator for the balloon. The fabric outer envelope is traditionally made up of yarn cops sewn onto each other, as described above. FIGS. 6*a* and 6B represent two portions 71 and 72 of adjacent yarn cops. These yarn cops are sewn onto each other by an initial stiff seam 73 and a second elastic seam 74. Elasticity may result from choice of a special thread or from the actual sewing method, for example stitched zig-zag seams.

The inner sewn surfaces of the folds intended for the sewn area are painted with a different color from the rest of the balloon or given a coat of a different color, for example by adhesion. Thus, when the balloon is only slightly inflated, the colored strip is not visible, whereas when the balloon begins to expand, this colored strip (75 in FIG. 6B) starts to appear. This provides a simple means of checking correct inflation of the balloon inner envelope.

Figure 7:
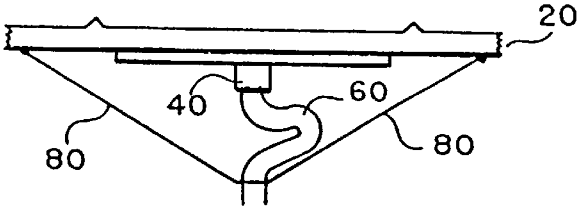

FIG. 7 illustrates feeder cable 60 fastening to the closing system in this case collar 20 using preferably elastic fasteners, 80. This prevents transmission of any movement between balloon and cable and stops the balloon from floating away if plug 30 is removed without the necessary precautions.

This invention can naturally accommodate a number of alternative methods and modifications made by professional in accordance with the different functions the balloon is required to fulfil.

If the balloon is required to provide outside lighting, for example for an emergency service intervention site, it shall be placed 5 to 10 meters from the ground, with an even white or yellow colored envelope containing a very powerful bulb. Tests carried out with halogen 1,000 watt bulbs have determined that satisfactory lighting was provided over a ground surface area of approximately one thousand $m^2$. This type of lighting is particularly satisfactory for emergency teams who are not dazzled, as they are if spotlights are used.

Another alternative of this invention is to place the feeder cable inside a telescopic mast.

What is claimed is:

1. A lighter than air device comprising a helium containing balloon secured to the ground and enclosing a light source positioned approximately in the middle of the balloon, the balloon being secured on a rod (40) which mounts the light source, a power feeder cable being connected to the light source and mounted through the rod, the light source having a power of at least 1,000 watts, sufficient helium being employed for cooling purposes, the balloon being constructed of a thin, flexible and expandable polyurethane film which is transparent to the outward flow of light and heat radiation without damage to the balloon, and impervious to the helium, and an outer envelope surrounding the balloon and constructed of a colored material, with optical properties which enable the outer envelope to receive and diffuse light from the balloon, without dazzling a viewer, and providing effective ground based lighting over a ground surface area of at least 1,000 $m^2$.

2. The air balloon of claim 1, including a pressure sensitive switch positioned inside the balloon, and giving off an alarm signal when the balloon pressure is less or greater than a preset pressure.

3. The air balloon of claim 1, in which the outer envelope is constructed of non-expandable silk or nylon.

4. The air balloon of claim 1, in which both the balloon and outer envelope define circular openings on the rod, and are associated with a closing mechanism, comprising: an inner ring-shaped collar (10) attached to an opening of the balloon and bearing against an opening of the outer envelope; an outer ring-shaped collar (20) locked against the inner collar and along outer edges of the openings of both the balloon and the outer envelope between the two collars; and a detachable plug (30) sealing the opening between the outer and inner collars, the detachable plug being fitted with at least one sealable orifice (36) to reach the balloon at its interior with means (35) for supporting the rod (40), the detachable plug defining a diameter greater than a diameter defined by the light source.

5. The air balloon of claim 4, comprising screw means for assembling the inner and outer collars.

6. The air balloon of claim 4, in which the detachable plug means are screwed onto one of the collars.

7. The air balloon of claim 4, in which the detachable plug means are clipped onto one of the collars.

8. The air balloon of claim 1, in which the inner envelope comprises an expandable polyurethane film, and the outer envelope comprises a material, which defines at least two areas sewn together, at least a portion of the sewn area being expandable, and upon stretching, reveals a strip having a different color than the outer envelope, thereby enabling the extent of balloon inflation to be visually monitored.

9. The air balloon of claim 1, in which the power feeder cable (60) secures the device to the ground, the rod comprises a telescopic mast and the power feeder cable is disposed inside the telescopic mast.

10. The air balloon of claim 4, comprising a feeder cable (60) secured by elastic means (80) to a closing mechanism for the device.

11. The air balloon of claim 1, in which the light source power exceeds about 6,500 watts.

12. The air balloon of claim 1, in which the light source power is in the range of from 1,000–about 6,500 watts.

13. The air balloon of claim 1, in which the light source power is positioned at least 5 meters from ground level and the light source power is in the range of from 1,000–about 6,500 watts.

14. The air balloon of claim 1, in which the thickness of the polyurethane film is in the range of a few dozen to a few hundred micrometers.

15. The air balloon of claim 1, in which the light source is positioned 5–10 meters from ground level, the light source power is at least 1,000 watts, and satisfactory lighting is provided over a ground surface area of at least 1,000 $m^2$.

16. The air balloon of claim 1, in which the light source includes halogen or an arc lamp.

* * * * *